No. 664,423. Patented Dec. 25, 1900.
D. M. McLAUGHLIN.
BALING PRESS.
(Application filed Sept. 14, 1900.)
(No Model.)
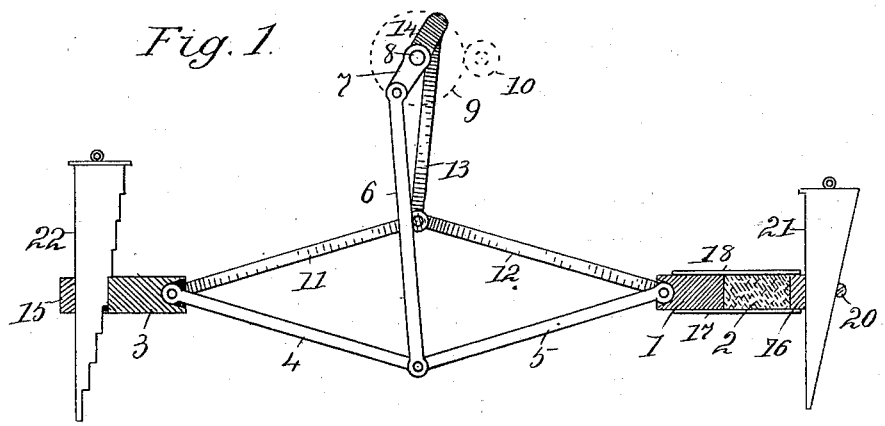
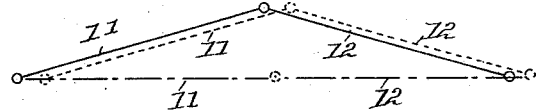
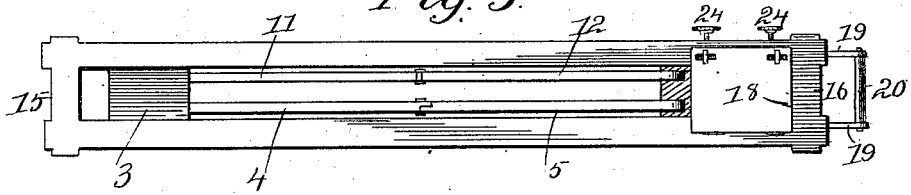
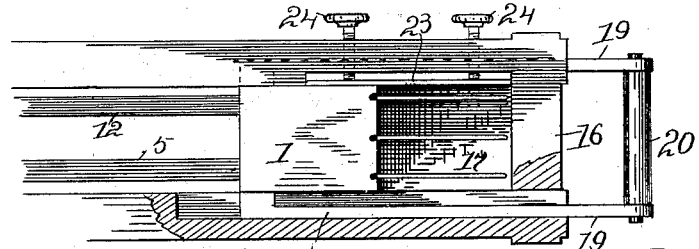
Witnesses
Nora Graham.
Ina Graham.
Inventor.
Daniel M. McLaughlin.
by L. P. Graham
his attorney

United States Patent Office.

DANIEL M. McLAUGHLIN, OF PANA, ILLINOIS.

BALING-PRESS.

SPECIFICATION forming part of Letters Patent No. 664,423, dated December 25, 1900.

Application filed September 14, 1900. Serial No. 30,057. (No model.)

*To all whom it may concern:*

Be it known that I, DANIEL M. McLAUGHLIN, of the city of Pana, county of Christian, and State of Illinois, have invented a certain new and useful Bale-Press, of which the following is a specification.

My invention is intended to re-press bales of compressible material—as hay, for instance—to reduce the bulk of the bale for storing and shipping purposes. It is exemplified in the structure hereinafter described, and it is defined in the appended claims.

In the drawings forming part of this specification, Figure 1 is a side elevation of the working parts of a press embodying my invention, the plunger, follower, and press-chamber being shown in section. Fig. 2 is a diagram illustrating the mode of operation of the press mechanism. Fig. 3 is a plan of the press-frame. Fig. 4 is a detail plan of the press-chamber.

The press-plunger is shown at 1. At 2 in Fig. 1 is shown the press-chamber, filled with material to be pressed. At 3 is shown a follower, against which the force that moves the plunger is exerted. A toggle-joint 4 and 5 extends from the follower to the plunger and buckles downward. Another toggle-joint 11 and 12 extends from the follower to the plunger and buckles upward when in operation. One toggle-joint bears against an end of the plunger at one side of the center thereof and the other toggle-joint bears against the end of the plunger at the other side of its center. The toggles buckle and extend simultaneously, but one rises as the other falls, and so the weight of one is neutralized by the weight of the other, and the operation of the machine is lightened or equalized to that extent.

The plunger has a bail that extends around and beyond the press-chamber, and a wedge, as 21, operates between the end of the chamber and the cross-bar of the bail to hold the plunger against backward motion. In this instance the bail consists of side bars 19 and cross-bar 20, and the cross-bar is preferably flat on one side and trunnioned at its ends to turn in the side bars and adapt the flat side to the wedge. The side bars of the bail are connected with the plunger, and they extend through grooves in the sides of the press-chamber somewhat as is shown in Fig. 4 of the drawings.

The follower 3 is slidable lengthwise of the press-frame, and a wedge 22 is inserted between the follower and a cross-bar 15 of the press-frame to receive the thrust of the follower and hold the follower against backward motion while the press is in operation. The wedge 22 is stepped, as shown in Fig. 1, and the horizontal extension of the steps preferably decreases from the small end of the wedge toward the large end thereof, so that the pressing movements of the plunger will become gradually shorter as the bale is compressed.

The press-chamber has a bottom 17 and a removable top 18, which is opened to admit the bales and permit their removal after compression. One side of the press-chamber is recessed, as shown in Fig. 4, and a plate 23 is held in position by screws 24 or their equivalent. After a bale has been placed in the chamber the plate 23 is set up against the bale and the plunger, and after the bale has been compressed the plate is moved into the recess to relieve side pressure on the bale and expedite its removal.

The means used to actuate the toggle-joints consists of a shaft 8, having a crank-arm on each of its ends and pitman-bars connecting the crank-arms with the toggle-joints. One crank-arm extends in one direction from the shaft, and the other crank-arm extends in the opposite direction. The crank-arm 7 connects with toggle-joint 4 and 5 through pitman 6, and arm 14 connects with toggle-joint 11 12 through bar 13. The shaft 8 may be turned by a gear-wheel 9 and a pinion 10, both of which are shown in dotted lines in Fig. 1.

The operation of the machine begins with the follower 3 near cross-bar 15 of the frame and the cross-bar 20 of the bail of the plunger near cross-bar 16 of the frame. As the toggle-joints are extended the compressible material in the press-chamber yields to the thrust of the plunger and the plunger is moved forward or into the press-chamber. The bail partakes of the motion of the plunger. The cross-bar 20 travels away from the end of the press-chamber a distance equal to the travel of the plunger, and wedge 21 descends into the space so formed and holds all the advantage gained by the thrust of the toggle-joint. Then as the toggle-joints are buckled, as shown in Fig. 1, the follower 3 is drawn away from cross-bar 15, and the wedge 22 drops into the space and takes up so much of the motion of the follower as may be desirable. In the earlier part of the operation substantially all of the forward travel of the follower may be held by the wedge 22, and as the resistance to the plunger increases as the compression proceeds the forward steps of the follower may be lessened in extent. Whatever step the follower takes is imparted to the plunger at the next extension of the toggle-joints, and so the action of the plunger is controlled through the follower.

In Fig. 2 the solid lines represent a buckled position of the toggle-joint. The broken lines show how the plunger is thrust forward by the extension of the toggle-joint, and the dotted lines show how the follower is drawn forward and a step of the toggle-joint is completed.

After a bale is compressed the wedges are withdrawn, the plate 23 is relieved, and the bale is removed.

The wedges may be controlled by hand or power, or they may be lowered by gravity alone. The wedge 21 needs no manipulation while a bale is compressing, and the wedge 22 will ordinarily descend as the follower moves forward without much attention.

I claim—

1. In a press, the combination of a press-chamber, a plunger in the chamber, means for holding the plunger against backward motion, and a toggle-joint and means for actuating the plunger forward by successive operations, substantially as described.

2. In a press, the combination of a press-chamber, a plunger in the chamber, means for holding the plunger against backward motion, a slidable follower, a toggle-joint interposed between the follower and the plunger and means for holding the follower against backward motion, substantially as described.

3. In a press, the combination of a press-chamber, a plunger in the chamber, a wedge to hold the plunger against backward motion, a slidable follower, a toggle-joint interposed between the follower and the plunger and a stepped wedge to hold the follower against backward motion, substantially as described.

4. In a press, the combination of a press-chamber, a plunger in the press-chamber, a bail for the plunger extending beyond the head of the chamber, means for moving the plunger toward the head of the chamber and a wedge between the cross-bar of the bail and the head of the chamber, whereby the plunger is held against backward motion, substantially as described.

5. In a horizontal press, the combination of a press-chamber, a plunger therein, means for holding the plunger against backward motion, a pair of toggle-joints acting on the plunger and buckling one upward and the other downward, a shaft outside the swing of the toggle-joints, crank-arms on the shaft and pitman-bars connecting the crank-arms with the toggle-joints, substantially as described.

In testimony whereof I sign my name in the presence of two subscribing witnesses.

DANIEL M. McLAUGHLIN.

Witnesses:
ELIZABETH METZGER,
D. M. KEYES.